United States Patent
Vandermolen

[11] Patent Number: 6,082,715
[45] Date of Patent: Jul. 4, 2000

[54] INTEGRATED SEMI-ACTIVE SEAT SUSPENSION AND SEAT LOCKUP SYSTEM

[75] Inventor: Gary L. Vandermolen, Fort Wayne, Ind.

[73] Assignee: Navistar International Transportation Corp, Chicago, Ill.

[21] Appl. No.: 09/264,789

[22] Filed: Mar. 9, 1999

[51] Int. Cl.⁷ .................................................. A47C 7/14
[52] U.S. Cl. ...................... 267/131; 267/136; 188/267.1; 248/550
[58] Field of Search .................... 267/131, 136; 188/267.1; 248/550

[56] References Cited

U.S. PATENT DOCUMENTS

| | | |
|---|---|---|
| 2,661,596 | 12/1953 | Winslow . |
| 4,650,148 | 3/1987 | Sakamoto . |
| 4,714,227 | 12/1987 | Holm . |
| 4,946,145 | 8/1990 | Kurabe . |
| 5,029,823 | 7/1991 | Hodgson . |
| 5,161,683 | 11/1992 | Hare, Sr. ............................... 188/267.1 |
| 5,344,204 | 9/1994 | Liu . |
| 5,396,973 | 3/1995 | Schwemmer . |
| 5,510,986 | 4/1996 | Williams . |
| 5,555,501 | 9/1996 | Furihata . |
| 5,582,385 | 12/1996 | Boyle . |
| 5,601,164 | 2/1997 | Ohsaki . |
| 5,609,353 | 3/1997 | Watson . |
| 5,652,704 | 7/1997 | Catanzarite . |
| 5,669,572 | 9/1997 | Crook . |
| 5,823,309 | 10/1998 | Gopaswamy . |
| 5,964,455 | 10/1999 | Catanzarite et al. ..................... 267/131 |
| 5,975,508 | 11/1999 | Beard ...................................... 267/136 |

*Primary Examiner*—Douglas C. Butler
*Assistant Examiner*—Mariano Sy
*Attorney, Agent, or Firm*—Jeffrey P. Calfa; Dennis Kelly Sullivan

[57] ABSTRACT

The vehicle seat suspension system of the present invention utilizes an extensible linkage supporting a seat frame. Height adjustment of the seat frame on the extensible linkage is done through an adjustable air spring. Movement of the seat frame due to jostling of the vehicle is normally dampened using a variable damping rate, extensible shock absorber. The damping rate is essentially pushed in infinity, fully locking the shock absorber positionally in response to detection of an accident condition. In one embodiment of the invention, a bleed valve between the compression and rebound chambers of the shock absorber is closed to effect lock up. In an alternative embodiment, the electrorheological or magnetorheological working fluid of a shock absorber may be solidified to lock positionally the shock absorber. Condition detection sensors include accelerometers and roll over detectors. To allow for the possible loss of vehicle power, the lock up signal is supplied by an independent power source.

15 Claims, 2 Drawing Sheets

INTEGRATED SEMI-ACTIVE SEAT SUSPENSION AND SEAT LOCKUP SYSTEM

BACKGROUND OF THE INVENTION

1. Field of the Invention

The present invention relates to suspension systems for vehicle seats. More particularly, the invention relates to integrating an adjustable damping mechanism with the seat suspension system which provides for locking up any travel of the seat during vehicle conditions usually indicative of an accident.

2. Description of the Problem and Background Art

Suspension systems for vehicle seats ideally simultaneously isolate vehicle occupants from vibration due to road conditions, allow the driver to select seat height and seat position for comfort, visibility and sure access to the controls, and prevent excess sustained physical dislocation of the seat due to hard vehicle cornering or deceleration.

In commercial trucks, seat suspension systems frequently employ an adjustable air spring, which is provides isolation from road vibration and can readily be used to set seat height. U.S. Pat. No. 5,799,922 to Timms et al., discloses one such an air suspension device based on an air spring and having a cross or scissors linkage for positioning an occupant seat. U.S. Pat. No. 4,946,145 to Kurabe discloses an air suspension device for a seat with bidirectional control of an air supply to the air spring, determined by the occupant's selection of a preferred seat height and detection of the occupants weight.

However, a simple spring does not function well in maintaining a consistent seat height in a moving vehicle. The seat will tend to oscillate up and down under the influence of repeated shocks and vibration and will assume a different equilibrium height during periods when the apparent load changes due to acceleration or cornering. As in primary vehicle suspension systems, seat suspension systems benefit from the addition of elements which operate against seat movement and force the decay of unwanted seat movement.

Generally speaking, there are three types of suspension system, each of which deals with the oscillation and displacement issue somewhat differently. Passive suspension systems may be constructed from a spring and a fixed rate motion damping device such as a viscous fluid or friction shock absorber. Semi-active suspension systems may also be based on a spring and a shock absorber, but provide mechanisms for adjusting the damping rate of the shock absorber. Active suspension systems operate by, in effect, dynamically adjusting the direction and magnitude of the force applied to the seat in response to a number of factors relating to vehicle conditions and operation. Unlike passive and semi-active systems, active suspension systems can add energy to the system.

Because passive suspension systems are based on fixed rate springs and shock absorbers, they are in effect a tuned system, which is optimized for a frequency of vibration or displacement determined by the seat occupant's weight. Meeting the objectives of vibration isolation and maintaining consistent seat height depends on optimizing seat suspension performance for high frequency vibration isolation and low frequency seat displacing forces, respectively. Such goals are inherently inconsistent for a system tuned for a single frequency.

Semi-active seat suspension systems, at the cost of some added complexity, are directed to overcoming some of the frequency linked limitations of passive suspension systems. U.S. Pat. No. 5,652,704 to Catanzarite illustrates such a system in a patent directed to a method for the dynamic control of the damper. The seat suspension system of the patent provides an air spring and an electrorheological or magnetorheological motion damping element. A variety of sensors, including a seat occupant sensor and a roll over sensor are monitored by a microprocessor which adjusts the viscosity of the working fluid in the preferred magnetorheological motion damping device to change the operating characteristics of the suspension system.

While occupant comfort is an important objective, under extreme conditions of vehicle motion, particularly those that can occur during and after a collision, the restriction of occupant movement, particularly vertical driver movement can be a safety consideration. For example, extreme vertical movement of the driver can prevent the driver from reaching with his or her feet the brake, clutch and accelerator pedals. Driver movement may also change the driver's position relative to other the controls. Air spring based seat suspensions can contribute to the problem of driver movement by providing an energy reserve urging movement of the seat in the same direction as the driver. Floor mounted belts, if in use by the driver or occupant, partially restrict movement of the seat by squeezing the driver into the seat when the seat moves upward and forward relative to the vehicle during a collision. However, interaction between the belt and movement of the seat can contribute to the driver "submarining", that is, the driver being pulled partly below the dash.

The present inventor is aware of a product of the Indiana Mills and Manufacturing, Inc., of Westfield, Ind. which is directed to this issue. The product provides a collision sensing element which when activated triggers a cam element driven by pyrotechnic elements for greatly tightening the belt on the driver or occupant and using the driver to pull the seat downwardly. While effective, the driver would be treated less roughly if the seat itself were restrained instead of the driver. U.S. Pat. 5,344,204 provides a seat positioning mechanism operating independently of the seat suspension system which repositions the seat rearwardly in response to detection of accident conditions. The system of the '204 patent it adds to the complexity and expense the seat installation.

SUMMARY OF THE INVENTION

It is an object of the invention to prevent vehicle occupant movement or dislocation stemming from seat movement during and after extreme vehicle movement.

It is a further object of the invention to provide for locking of seat position during conditions of rapid changes in vehicle direction, velocity and orientation indicative of an accident.

It is a still further object of the invention to integrate seat positional locking with the seat suspension system.

It is yet another object of the invention that the locking mechanism work at any seat extension or load condition.

It is still another object of the invention to reduce the degree to which motion of the seat contributes to movement of a vehicle driver or occupant during an accident.

The vehicle seat suspension system of the present invention utilizes an extensible linkage supporting a seat frame. Height adjustment of the seat frame on the extensible linkage is done through an adjustable air spring. Movement of the seat frame due to jostling of the vehicle is normally dampened using a variable damping rate, extensible shock absorber. The damping rate is essentially adjusted to infinity, fully locking the shock absorber positionally in response to detection of an accident condition. In one embodiment of the invention, a bleed valve between the compression and rebound chambers of the shock absorber is closed to effect lock up. In an alternative embodiment, the electrorheological or magnetorheological working fluid of a shock absorber may be solidified to lock positionally the shock absorber. Condition detection sensors include accelerometers and roll over detectors. To allow for the possible loss of vehicle power, the lock up signal is supplied by an independent power source.

Additional effects, features and advantages will be apparent in the written description that follows.

DETAILED DESCRIPTION OF THE INVENTION

Figure 1:
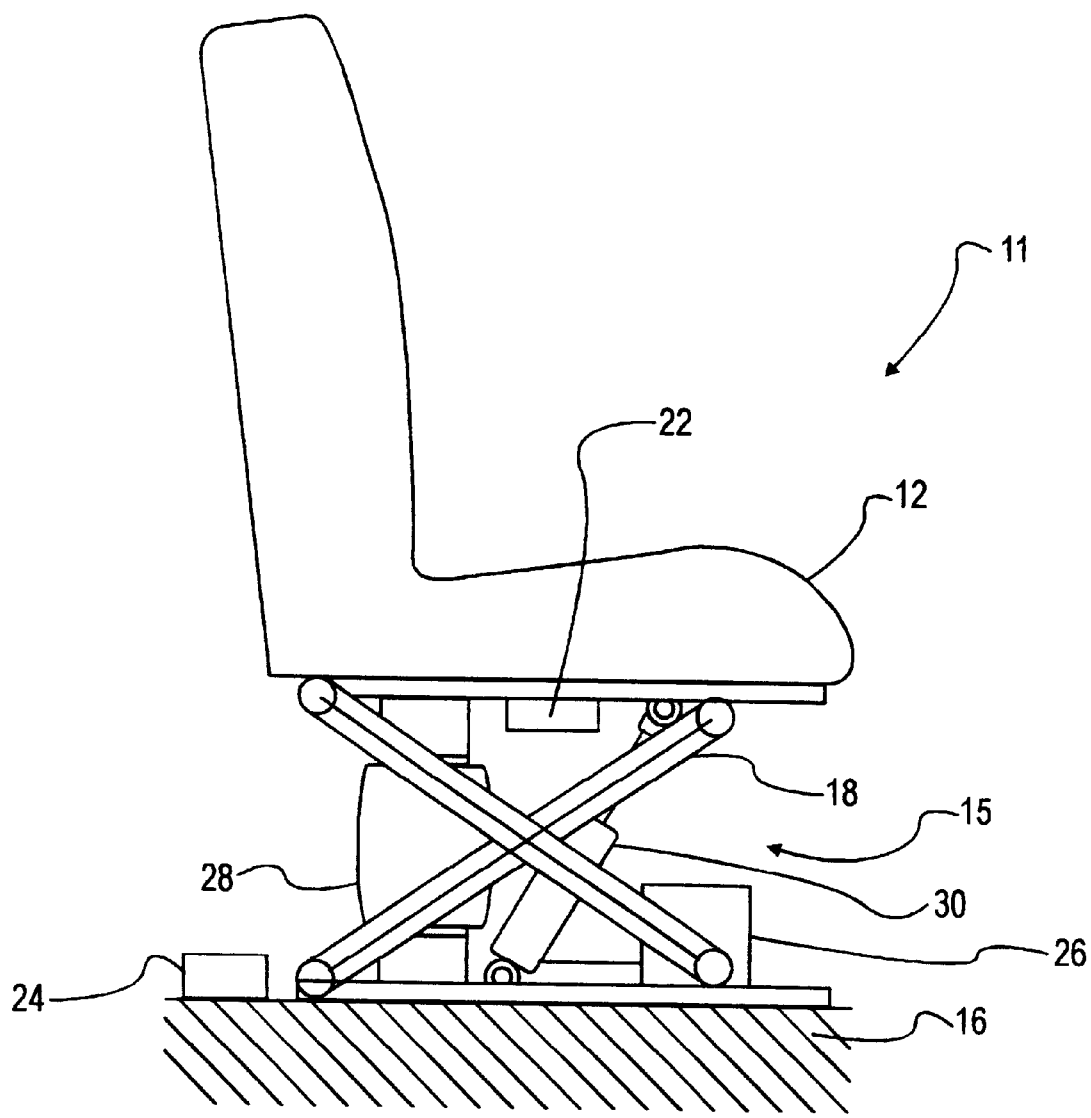
FIG. 1 is a side elevation of a vehicle seat suspension of a type with which the present invention may be practiced.

Referring generally to FIGS. 1, a truck seat suspension assembly 11 is illustrated. The seat suspension 11 incorporates a semi-active suspension system 15 as part of seat assembly 11. The semi-active suspension system 15 includes a controllable air spring 28 (alternatively a mechanically loaded compression spring could be used), a scissors type extensible frame 18 and a controllable damping element 30, all extending upwardly from vehicle chassis 16. Superficially, semi-active suspension system 15 resembles a passive suspension system, however, controllable damping element 30, while a viscous fluid type damping device, has a controllable damping rate implemented by controlling restriction of the communication between the compression and rebound chambers of the damping device, or by using an electrorheological damping fluid the viscosity of which may be rapidly changed.

A vehicle occupant (not shown) sits on a seat 12, and with the seat constitutes most of the unsprung mass of the seat assembly 11. Seat 12 rests on the extensible frame 18, its equilibrium height set by adjustment of the normal air pressure in air spring 28, which is positioned between chassis 16 and seat 12 to vertically support the seat. Movement of seat 12 is damped using damping device 30 which is similarly positioned between seat 12 and chassis 16 (the unsprung system). Damping device 30 resists, but normally does not prevent, vertical movement of the seat. It should be noted that the present invention is not limited to seat suspension assembly 11, rather the assembly is representative of one type of suspension linkage and arrangement of spring and damping components to which the present invention may be applied.

A collision sensor, which may be an accelerometer 22, shown mounted to the bottom side of seat 12, generates either a scaled signal indicating deceleration and acceleration, or an on/off indication of deceleration exceeding a threshold value. Rollover sensor 24 provides an on/off indication of a rollover condition. While the sensors are illustrated as being mounted on or adjacent to seat assembly 11, it is not essential to the operation of the invention that they be located there. The signals generated by accelerometer 22 and rollover sensor 24 are applied to a suspension controller 26 (illustrated below) which generates and applies a variable control signal to damping device 30.

Under emergency conditions indicative of an accident involving the vehicle, suspension system 15 locks the vertical position of seat 12 by positionally freezing damping device 30 responsive of the control signal from suspension controller 26 exceeding a threshold level. During and after collisions between a vehicle in which the seat suspension assembly 11 is mounted, and other vehicles or objects, the seat suspension assembly 11 of the present invention is subjected to forces associated with large and rapid changes in velocity and direction of travel. Generally, it is preferable for a vehicle occupant to be held in a constant position relative to the cabin and to the controls of the vehicle. Holding the occupant stable should also aid the effectiveness of any airbag and thereby help prevent injury to the occupant. In cases where the vehicle remains in motion after the collision, keeping the driver relatively motionless also helps the driver retain some control over the vehicle by keeping the driver in a fixed position relative to the controls. Ideally the driver will remain at his or her usual distance from the controls, but even if this is not the case, finding the controls should be aided by the fact that the driver is not moving as quickly or as much relative to them. Seat suspension assembly 11 works to keep a driver relatively motionless within the passenger cabin by positionally locking itself within the cabin during and after a collision. In the present invention this is achieved by locking the vertical height of seat 12 in response to substantial negative acceleration. Locking of the position of the seat suspension assembly 11 is effected by locking damping device 30 at its current extension at substantially the instant of collision, which will normally be close to the extension associated with the preferred height of seat.

Figure 2:
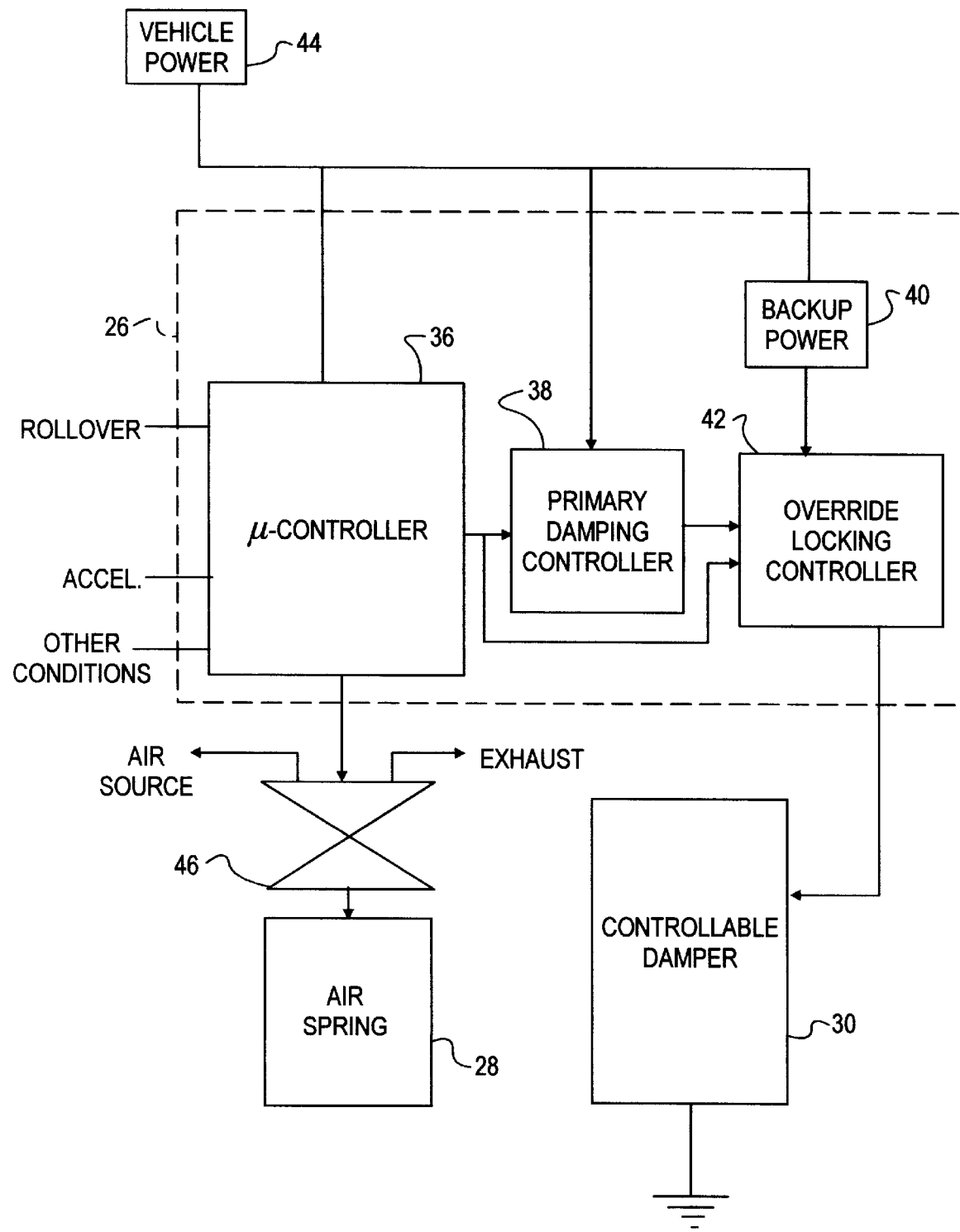
FIG. 2 is a schematic diagram of a control system embodying the present invention.

FIG. 2 is a schematic view of controller 26. Controller 26 includes features relating to normal ride control of controllable damper 30 and air spring 28 as well as providing for the emergency conditions described above. A microcontroller 36 monitors sensors providing indication signals relating to a number of conditions, including acceleration and rollover or operator inputs, such as a request to adjust seat height or egress from the vehicle by the occupant. Responsive to indication of an accident, microcontroller 36 cuts the control signal level to the primary damping rate controller 38 and override locking controller 42 to zero. Thus, if power from power source 44 is lost, particularly as a result of an accident, the signal level indicative of an accident condition is still supplied.

Microcontroller 36 applies the control signal to a primary damping rate signal generator 38 (which may be digital to analog converter or a voltage regulator, depending upon the application) and an override, emergency damping device locking signal generator 42. If the control signal from microcontroller is non-zero, the override locking controller passes the output of the primary damping rate controller 38 directly to the controllable damper. Upon the control signal falling to zero (or loss of the control signal), override locking controller 42 connects controllable damper 30 directly to the backup power source 40, which may be implemented using a capacitor. Use of a backup power source insures that the power required to operation devices such as electrorheological shock absorbers is available even if vehicle power is lost. Backup power source 40 may be kept charged by vehicle power 44 during normal operation of the vehicle.

Microcontroller 36 may provide other functions relating to control of suspension system 15 such as adjusting the air pressure in air spring 28 by selective connection of the air spring to a source of pressurized air or exhausting the contents of air spring 28 through a valve 46.

In response to sensed conditions indicative of an accident or roll over, the electrorheological fluid in controllable damper 30 is solidified by application of a sufficiently strong electrical field supported from backup power source 40. Alternatively, a valve positioned in the communication duct between the compression and the rebound chambers of the controllable damper 30 may be closed, which also locks the position of the shock absorber. Again due to the possibility of loss of vehicle power as a consequence of an accident, the source of power for either type of shock absorber/damping device should come from a source other than the vehicle's electrical system.

The present invention integrates a vehicle seat position locking system with a suspension system for the seat, helping reduce movement of the vehicle occupants during an accident. The vehicle seat suspension system also reduces the loads imposed upon vehicle occupants by the passenger restraint system since the restraint system does not have to be used to restrain the seat as well as its passenger. The seat suspension system of the present invention is reactive to conditions indicative of a possible accident to increase seat suspension motion damping and is fully integrated with the seat suspension system. The preferred embodiment of the invention provides locking of a seat assembly, however the invention may be effectively applied to provide a locking and variable damping rate suspension mechanism for a vehicle operator cockpit, or even a full cab suspension.

While the invention is shown in only one of its forms, it is not thus limited but is susceptible to various changes and modifications without departing from the spirit and scope of the invention.

What is claimed is:

1. A semi-active vehicle seat suspension system comprising:
   a load bearing frame;
   a lower frame for mounting to a vehicle;
   an extensible linkage positioning the load bearing frame relative to the lower frame;
   a spring urging a selectable extension of the extensible linkage;
   an extensible motion damping device positioned to dampen motion of the load bearing frame relative to the vehicle;
   a non-operator initiated condtion sensing element responsive to only accident conditions involving the vehicle for generating an accident indication signal; and
   means responsive to the accident indication signal for locking the extension of the extensible motion damping device.

2. A semi-active vehicle seat suspension as claimed in claim 1, further comprising a power storage element connected to a vehicle power source for applying a damping rate control signal to the extensible motion damping device sufficient to lock positionally the extensible motion damping device.

3. A semi-active vehicle seat suspension as set forth in claim 2, wherein the extensible motion damping device is an electrorheological shock absorber.

4. A semi-active vehicle seat suspension as set forth in claim 2, wherein the sensing element responsive to accident conditions further comprises:
   a rollover sensor; and
   a collision sensor.

5. A semi-active vehicle seat suspension as claimed in claim 3, wherein the spring is an air spring.

6. A semi-active vehicle seat suspension as claimed in claim 4, wherein the spring is an air spring.

7. A suspension system for a seat in a vehicle, the suspension system comprising:
   a compression spring positioned between the seat and an interior vehicle surface for supporting the seat above the surface;
   non-operator initiated condition accident sensing elements connected to provide only accident condition indication signals;
   a damping rate signal generator for supplying a locking level damping rate signal responsive to occurrence of one or more accident condition indication signals; and
   a shock absorber, having a controllable damping rate, positioned with respect to a load for damping movement of the load and being responsive to the locking level damping rate signal to lock in position.

8. A suspension system as set forth in claim 7, wherein the damping rate signal generator includes:
   a microprocessor responsive to output signals from a plurality of condition sensors for determining the damping rate signal;
   a power source backup to a vehicle power source and actuable by the microprocessor for supplying the locking level damping rate signal.

9. A suspension system as set forth in claim 8, wherein a null signal corresponds to the locking level damping rate signal.

10. A suspension system as set forth in claim 9, wherein the shock absorber is an electrorheological shock absorber.

11. A suspension system as set forth in claim 10, wherein the accident sensing elements include a rollover sensor and a collision sensor.

12. A vehicle seat suspension system comprising:
   a compression spring;
   the vehicle seat being supported on the compression spring;
   a shock absorber responsive to a damping control signal for varying its damping rate, the shock absorber being connected between the vehicle seat and a segment of the vehicle for damping movement of the vehicle seat relative to the vehicle;
   a plurality of non-operator initiated condition accident sensors, each for providing an accident indication signal;
   a damping rate signal generator for generating the damping rate signal, being responsive to the accident indication signal from each of said plurality of non-operator initiated condition accident sensors for generating a maximum resistance level damping rate signal effective to lock the position of the shock absorber; and
   a locking controller connected to receive the maximum resistance level damping rate signal for applying in response thereto the damping control signal to the shock absorber.

13. A vehicle seat suspension system as set forth in claim 12, wherein the maximum resistance level damping rate signal is a null signal.

14. A vehicle seat suspension system as set forth in claim 13, wherein a locking signal generator is connected to receive the damping rate signal and is responsive to the null signal for applying an output from an independent power source as the damping control signal.

15. A vehicle seat suspension system as set forth in claim 14, wherein the compression spring is an air spring.

* * * * *